(12) United States Patent
Peterson (10) Patent No.: US 6,411,778 B1
(45) Date of Patent: Jun. 25, 2002

(54) PORTABLE BACKLIT STUDIO (75) Inventor: Trygve D. Peterson, Savage, MN (US)

(73) Assignee: Lifetouch National School Studios, Inc., Eden Prairie, MN (US)

( * ) Notice: Subject to any disclaimer, the term of this patent is extended or adjusted under 35 U.S.C. 154(b) by 3 days.

(21) Appl. No.: 09/604,597

(22) Filed: Jun. 27, 2000

(51) Int. Cl.[7] .............................................. G03B 15/00
(52) U.S. Cl. ................................................ 396/1; 396/3
(58) Field of Search .............................. 396/1, 3, 5, 4; 359/461; 362/3, 16

(56) References Cited

U.S. PATENT DOCUMENTS

| | | | | |
|---|---|---|---|---|
| 3,665,828 A | * | 5/1972 | Reiter | 396/3 |
| 5,235,368 A | * | 8/1993 | Oglesbee | 396/3 |
| 5,828,908 A | * | 10/1998 | Mauchan | 396/3 |
| 5,953,542 A | * | 9/1999 | Fleming | 396/3 |
| 5,956,525 A | * | 9/1999 | Minsky | 396/3 |
| 6,046,845 A | * | 4/2000 | Niwa et al. | 359/461 |
| 6,076,935 A | * | 6/2000 | Kester | 362/16 |

* cited by examiner

Primary Examiner—Christopher Mahoney
(74) Attorney, Agent, or Firm—Nikolai & Mersereau, P.A.

(57) ABSTRACT

A portable photographic studio that is relatively lightweight, easily assembled and disassembled, easily carried and is easily transported in even a compact automobile is provided by the present invention.

17 Claims, 9 Drawing Sheets

PORTABLE BACKLIT STUDIO

BACKGROUND OF THE INVENTION

I. Field of the Invention

This invention relates generally to backdrops used in photography. More specifically, the present invention relates to a collapsible, portable backlit studio that can be readily transported to a variety of locations, such as schools, for use by photographers.

II. Description of the Prior Art

For many years photographers have used natural and artificial backdrops in their photographic work. In the case of natural backdrops, the photographer brought the subject to be photographed, the camera, supplemental lighting and other ancillary equipment to the location to be used as a backdrop. In the case of artificial backdrops, the photographer would typically set up a permanent studio which incorporated one or more permanent artificial backdrops and the other photographic equipment. The photographer would then invite the subjects to be photographed to come to the studio. This generally works well when only one or a small number or subjects are involved in the photography session. However, it presents an unworkable situation when large groups of people are to be photographed. This is particularly true in the realm of school photography where each student in the school is photographed and then grouped by class for a class picture.

Generally, efforts to use school equipment or facilities have proven to be either unsatisfactory or inefficient. Lighting is always an issue. Also, there is often no entirely suitable backdrop that can be used due to color, state of repair, or the need to use it for instruction of students. Thus, it can be seen that a need exists for an improved backdrop apparatus which overcomes above-identified shortcomings of the prior art.

SUMMARY OF THE INVENTION

The present invention provides a portable, backlit studio that can be easily transported from place to place, and used by photographers to capture high quality, aesthetically pleasing photographs of large numbers of individual subjects. The present invention is ideally suited for use in the school, church, or team sport photography industries. Key aspects of the present invention are its transportability and ease of setup.

In view of the foregoing, a first object of the present invention is to provide a portable studio for use by photographers.

A second object of the present invention is to provide a portable studio that is light, easy to carry and can be collapsed to fit into a convenient protective carrying case.

A third object of the present invention is to provide a portable studio that can be easily transported in even the smallest of compact cars.

A fourth object of the invention is to provide a portable studio that is quick and easy to set up.

A fifth object of the invention is to provide such a studio which is made entirely out of captured hardware so parts do not get lost during assembly, disassembly or transport.

A sixth object of the present invention is to provide such a studio that can only be set up one way so that potential errors in assembly are eliminated.

A seventh object of the present invention is to provide a photographic studio which is safe, reliable and can be assembled in relatively small areas such as at the end of a hallway of a school.

An eighth object of the present invention is to provide a portable photographic studio that not only is useful in taking quality pictures, but also helps the photographer convey an image of professionalism, efficiency and skill.

These and other objects of the invention are achieved by providing a portable studio that includes a setup mat, a collapsible frame, a backdrop, a softbox, a kneeler, a prop stand, a table and lighting. The setup mat is, in essence, a map showing where to place each of the other items of the portable studio as well as the auxiliary lighting and the camera itself. The frame is compact, lightweight and can be set up in about a minute. No tools are required for assembly. The backdrop attaches to the frame and includes is a high quality foldable (rollable) image that becomes the background for the photographs. The softbox is used to backlight the entire background image. The softbox applies a uniform distribution of light across the entire background image so that high quality portraits can consistently be made. The kneeler, prop stand and table locate the subject within the tolerance of ±3 inches of a desired location on the mat in front of the background image and within the depth of field for the camera. All of these components work together to achieve the objects of the present invention.

DETAILED DESCRIPTION OF THE PREFERRED EMBODIMENTS

Figure 1:
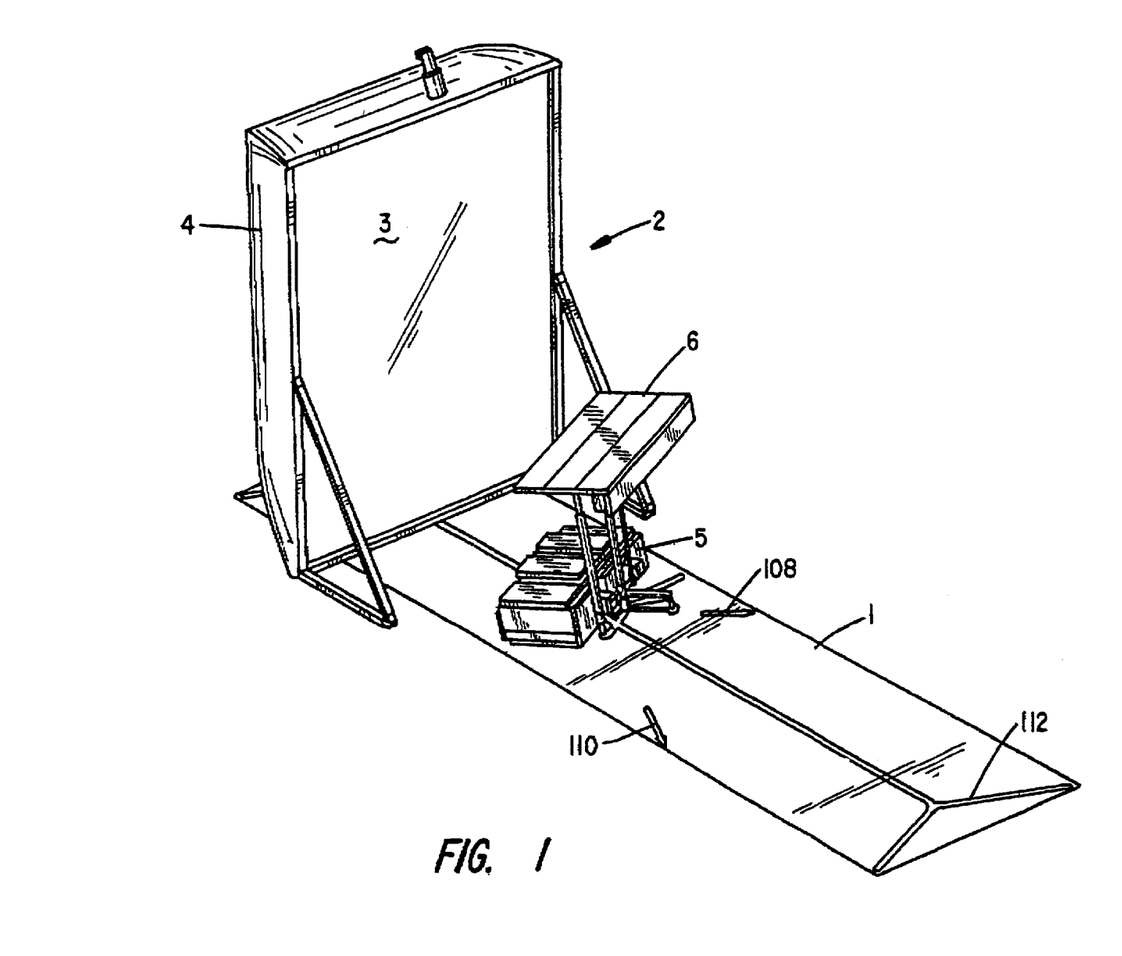
FIG. 1 is a perspective view showing the various components of the present invention assembled for use in taking photographs.

In FIG. 1, one preferred embodiment of the portable backlit studio of the present invention is shown to include a setup mat 1, a collapsible frame 2, a backdrop 3, a softbox 4, a kneeler 5 and a prop stand 6. A table, various auxiliary lights and a camera (not shown) are also positionable on the mat. As will be discussed more fully later with respect to FIG. 9, the mat 1 has various markings imprinted thereon to show where the other components are to be positioned on the mat 1. Thus, no measuring device, such as a ruler or yardstick, is required to set up the portable backlit studio.

Figure 2:
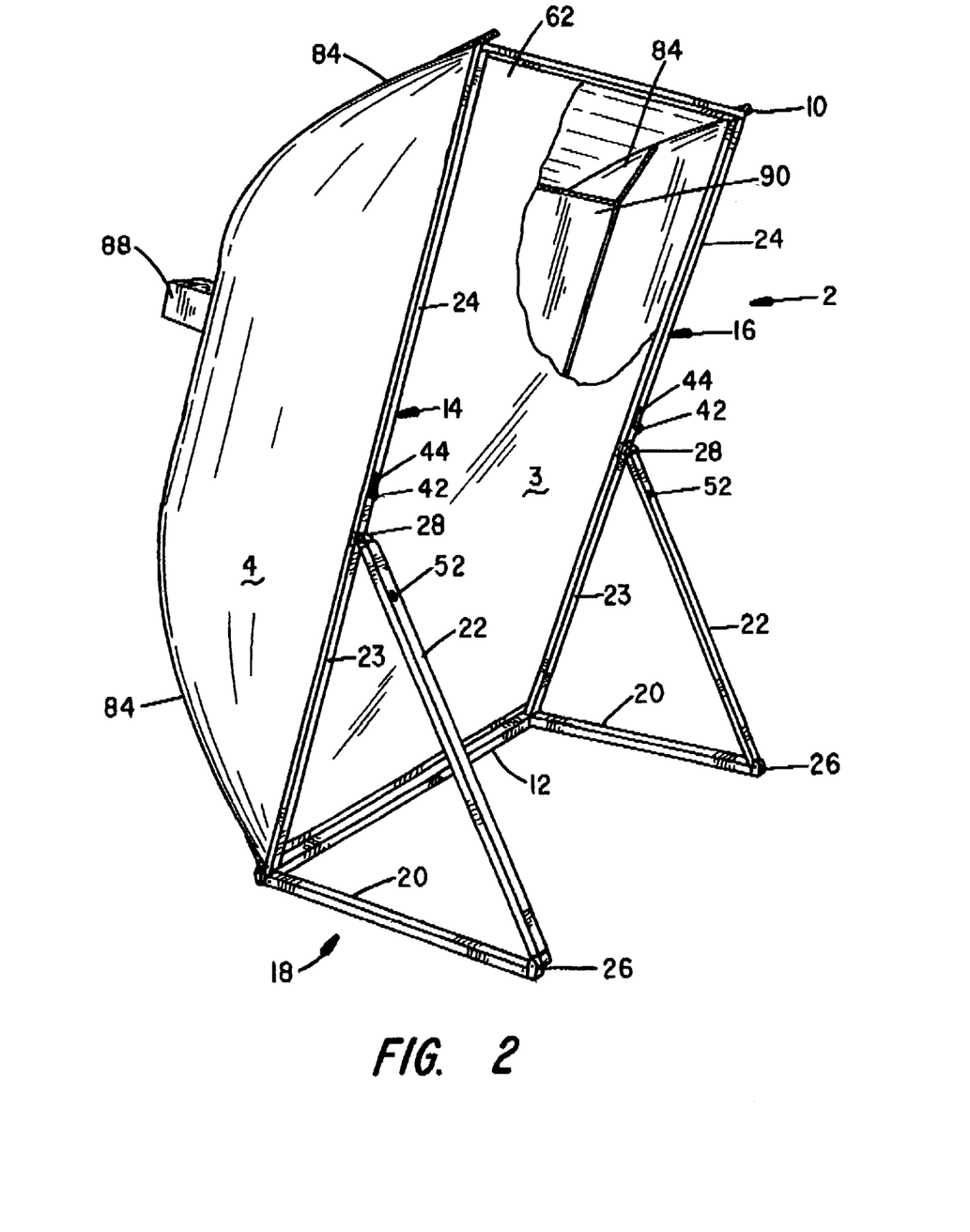
FIG. 2 is a perspective view of the frame, softbox and background of the present invention.
Figure 3:
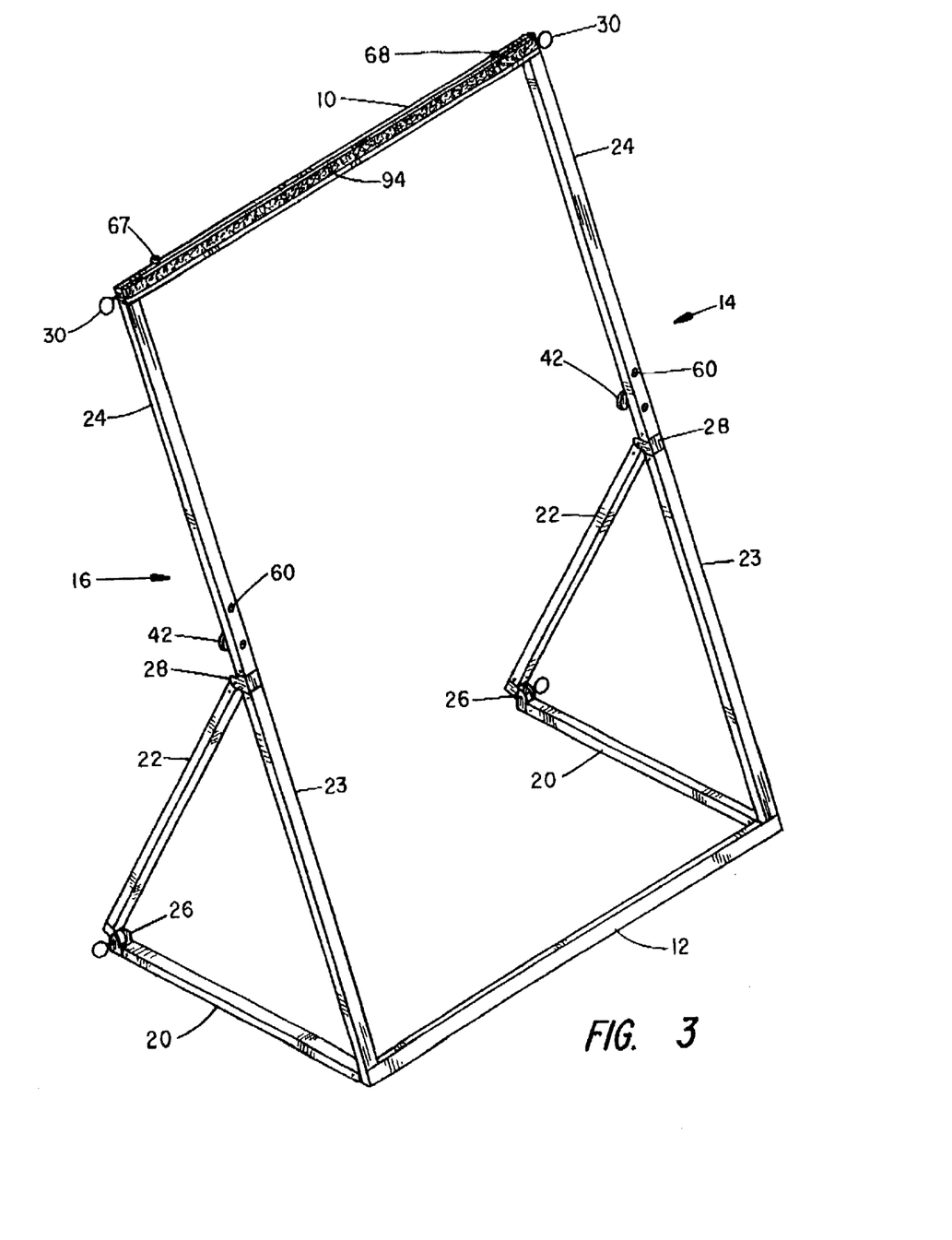
FIG. 3 is a perspective view of the frame of the present invention.

The collapsible frame 2 of the present invention includes four rails, a top rail 10, a bottom rail 12, a first side rail 14 and a second side rail 16. The first and second side rails 14 and 16 each have the same construction. Each includes a triangular-shaped base 18 comprising a base member 20, a support member 22, and a lower leg 23. Each side rail also includes an upper leg 24. The side rails 14 and 16 each also include two hinges 26 and 28. Hinge 26 is used to couple one end of the support member 22 to the base member 20. Hinge 28 is a double hinge and is used to couple the lower leg 23 to the upper leg 24 and the other end of the support member 22 to the upper leg 24 and lower leg 23.

Figure 4:
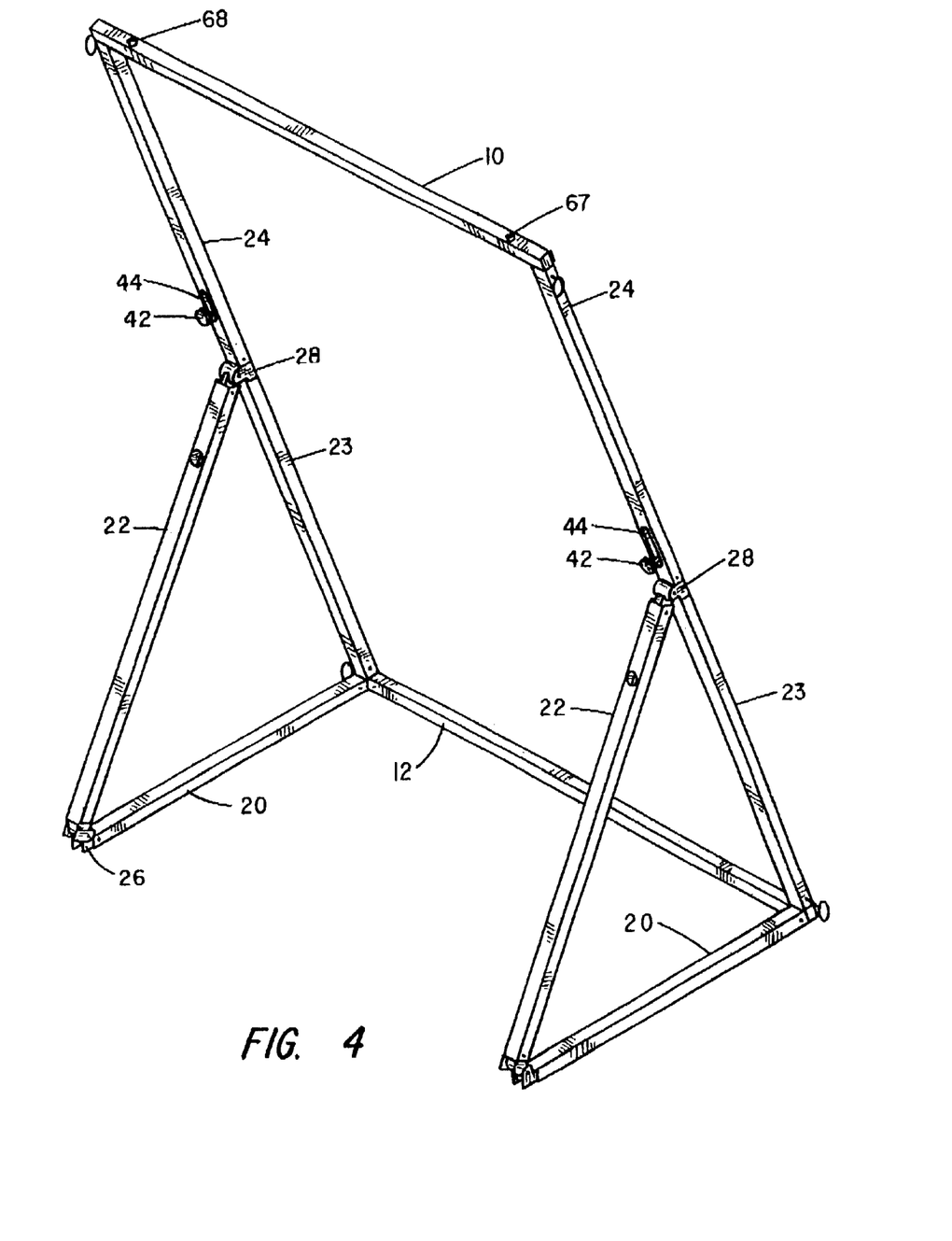
FIG. 4 is another perspective view showing the frame.

The top rail 10 has L-shaped connectors 30 associated with each of its ends. See FIG. 4. The L-shaped connectors 30 are fixed to the top rail 10 designed to slide into and out of the free ends of the two upper legs 24 for assembly and disassembly. The bottom rail 12 has connectors 32 associated with each of its ends. These connectors 32 include a first member 34 which is inserted into the bottom end of the lower leg 23 to secure the lower leg 23 to the bottom rail 12 and a second member 36 which is inserted into the free end of the base member 20 to secure the base member 20 to the bottom rail 12. Once the top rail 10 and bottom rail 12 have been attached to the side rails 14 and 16 as described, the upper legs 24 and top rail 10 can be rotated into position and locked in place so that the upper legs 24 and lower legs 23 are aligned with each other.

Figure 5:
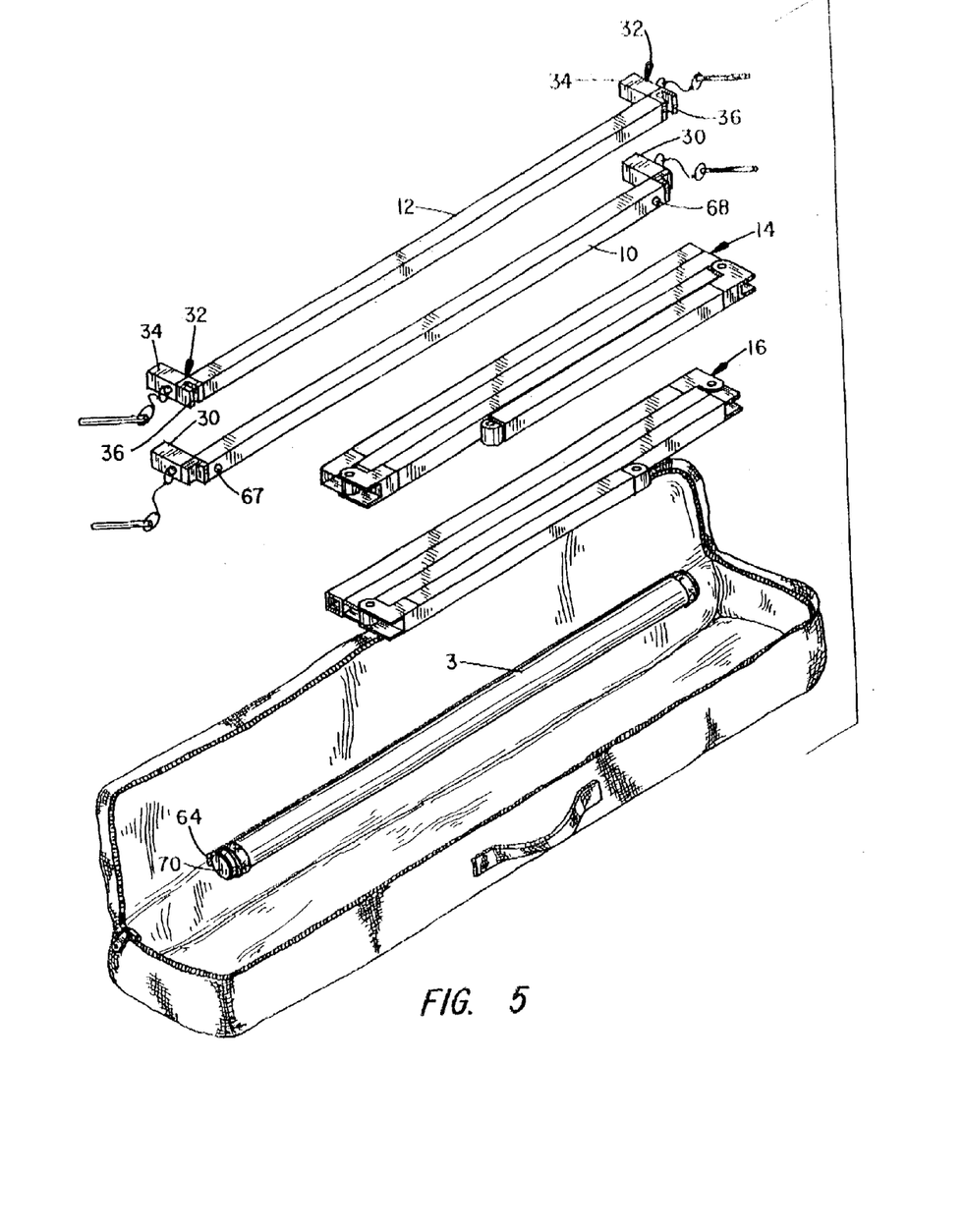
FIG. 5 is a perspective view showing the frame and background of the present invention along with a carrying case.

Another significant aspect of the frame is the manner in which the upper legs 24 and lower legs 23 are locked in place when the frame is assembled. As shown in FIGS. 3 and 5, both the upper legs 24 and the lower legs 23 are hollow channels. Located within the channel of each upper leg 24 is a slidable guide 40. The slidable guide 40 is coupled to a knob 42 that extends out of the channel through an elongated slot 44 cut in the wall of upper leg 24. Coupled to and projecting downwardly from the slidable guide 40 is a tapered locking pin 46. The tapered locking pin 46 is designed to mate with a hole 50 in a lock block 48. The lock block 48 is fixed in place in the channel of the lower leg 23. The knob 42 is used to slide the tapered locking pin 46 into and out of engagement with the hole 50 in the lock block 48. When the tapered locking pin 46 is engaged with the hole 50 in the lock block 48, the upper leg 24 and lower leg 23 are locked in their assembled position. See FIG. 3. When the tapered locking pin 46 is retracted, the upper leg 24 and lower leg 23 are free to pivot with respect to each other about the hinge that joins them together. See FIG. 5.

It should be noted that when the side rails 14 and 16 are folded up for storage and transport, the knob 42 fits in a hole 52 cut in support member 22. See FIG. 1.

Figure 6:
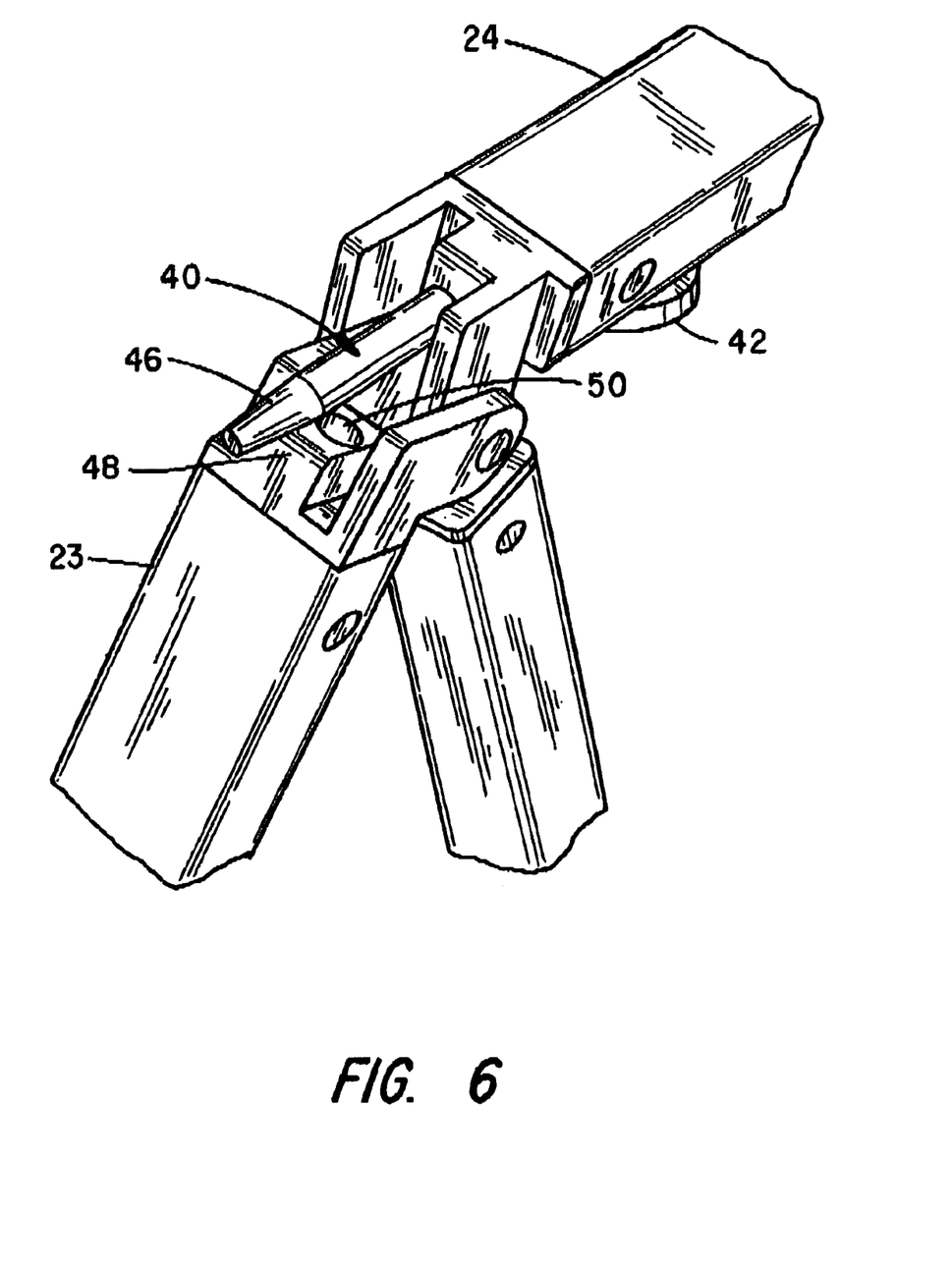
FIG. 6 is a close-up perspective view showing the hinge and lock arrangement of the frame in detail.

Another feature of the lock feature is related to the way the shaft 43 of the knob 42 cooperates with the slidable guide and the upper leg 24. Specifically, the rail has a small hole 60 through its back side through which the shaft can penetrate to hold the locking pin 46 in the retracted unlocked position. Note that there is no similar hole for holding the locking pin 46 in the extended, locked position. Gravity and friction are sufficient to prevent inadvertent unlocking of the device. If the pin did extend through such a hole when in the locked position, it might prevent the backdrop 3 from lying flat against the frame 2.

Figure 7:
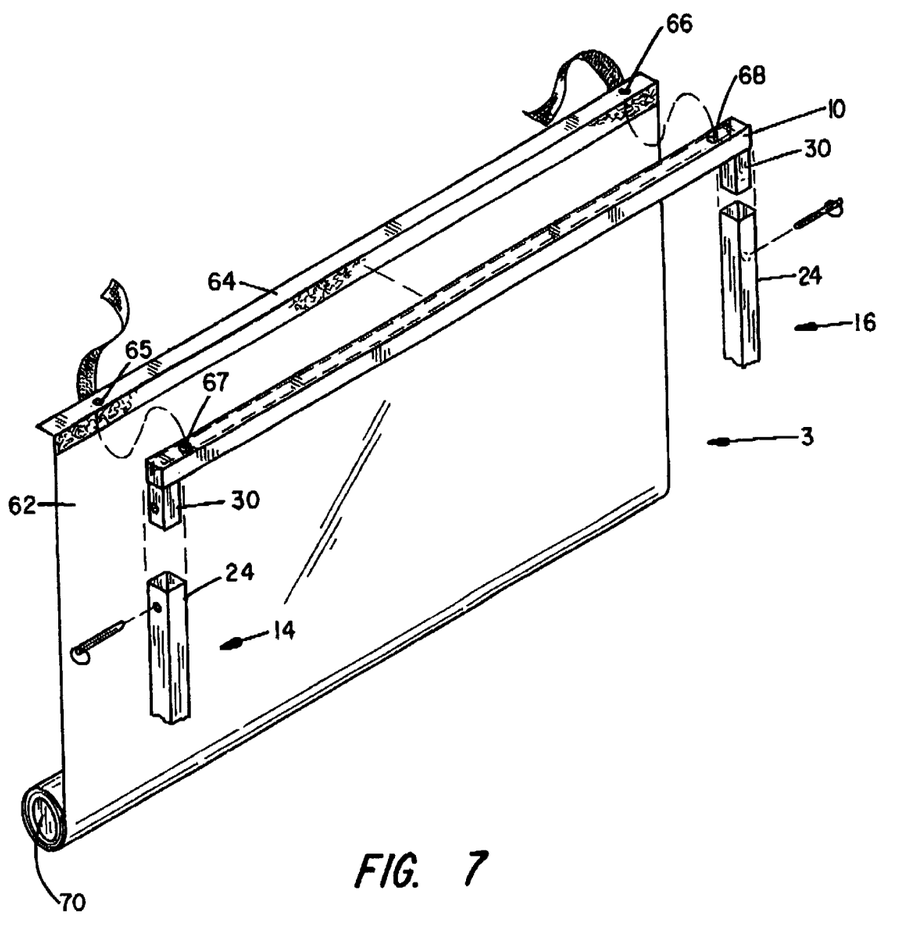
FIG. 7 is a perspective view showing the manner in which the backdrop and frame are to be assembled.

Turning then to the backdrop 3, it includes a length of material of either a desired color or upon which a background image is imprinted. This length of material is referred to herein as the background 62. Ideally, the background 62 is translucent so light can penetrate the background 62 from the rear. The top of the background 62 is joined to an angled bracket 64. There are two holes 65 and 66 in the bracket which mate with pins 67 and 68 on the top rail 10 of the frame 2 to hold the backdrop 3 to the frame 2. The bottom of the background 62 is joined to a roller 70 which is sufficient weight to maintain the background 62 in a straight, wrinkle-free manner when the backdrop is positioned on the frame 2. When not in use, the background 62 is rolled up over the roller 70 for storage. Given the fact that the upper and lower legs of the side rails 14 and 16 of the frame 2 are not perpendicular to the ground and tilt toward the camera, the roller 70 and bracket 64 are sufficient to retain the background 62 in the desired orientation.

Figure 8:
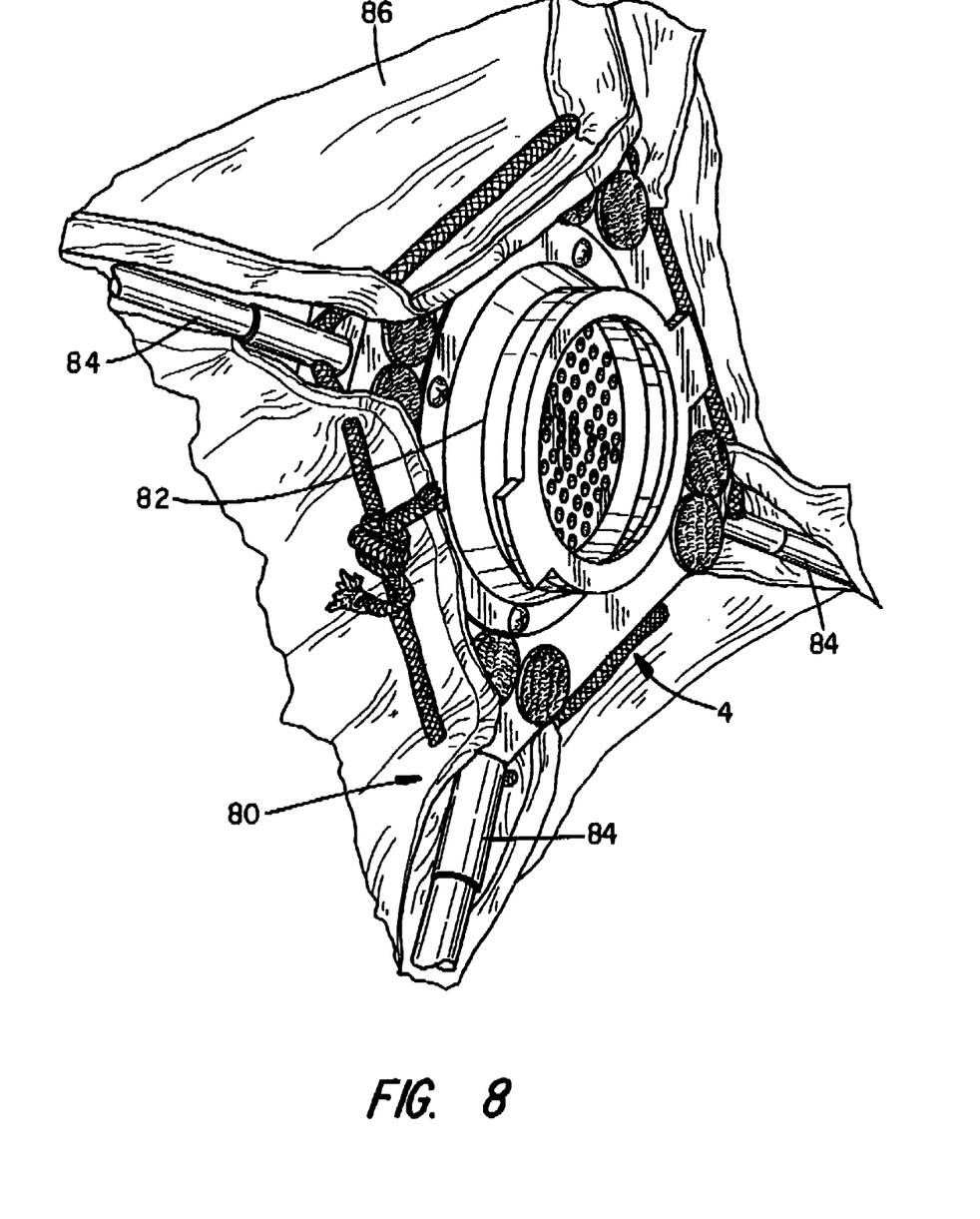
FIG. 8 is a perspective view of the light mount softbox of the softbox of the present invention.

The softbox 4 used in the system of the present invention is designed to be positioned behind the frame 2 and completely surround the back of the background 62. The softbox 4 is designed to backlight the background 62 in a consistent manner so that the intensity of light hitting the back of the background 62 is generally consistent from point to point. The softbox 4 has a frame 80 made of a central light mounting 82 and four elongate flexible rods 84 projecting therefrom. A lightweight reflective covering 86 is mounted to the frame 80. A light source 88 is coupled to the mounting 82. The softbox also includes reflecting baffles such as 90 which serve to diffuse the light so that the light hits all portions of the background 62 with approximately equal intensity. To ensure the softbox 4 stays in the proper position, hook and loop type closures 94 are used to releasably couple the top of the softbox 4 to the bracket 64 of the backdrop 3 when that bracket 64 is coupled to the top rail 10 of the frame 2.

Several other features are provided to ensure good lighting of the subjects to be photographed in front of the background. Specifically, a mounting hole is provided in the top rail so that a light which shines down on the head of the subject can be mounted to the frame. This light helps the camera create the appearance of a separation between the background and the subject. The mat 1 also includes markings which indicate where the various components are to be positioned relative to each other.

Figure 9:
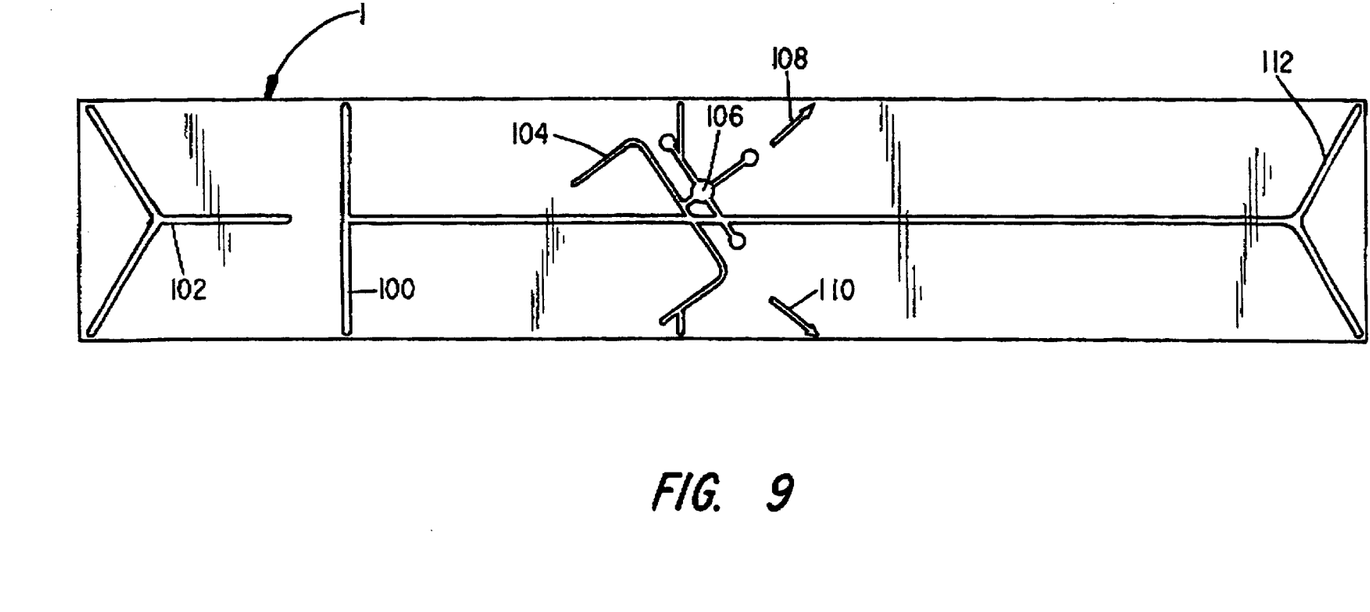
FIG. 9 is a top view of the set-up mat of the present invention.

As shown in FIG. 9, the mat 1 includes a line 100 which is used to identify the position of the bottom rail 12 of the frame 2. Markings 102 are used to position the softbox 4 behind the frame. Markings 104 are used to position a kneeler 5 and markings 106 are used to place a prop stand 6. Arrows 108 and 110 can be used to position auxiliary lighting. Finally, mark 112 is used to properly position the camera.

The foregoing discussion is intended to describe the preferred embodiment. Changes can be made without deviating from the concept of providing a compact, readily portable photographic studio. Thus, the scope of the invention is intended to be limited only by the claims.

What is claimed is:

1. A portable photography studio comprising:
   a. a plurality of rails;
   b. at least one support member for holding said frame in a predetermined position;
   c. a backdrop comprising a translucent background that can be illuminated from the back, said background secured to said frame; and
   d. an illumination device which illuminates the background from the back so that all portions of the back of the background are illuminated with substantially equal intensity.

2. The portable photography studio of claim 1 wherein said plurality of rails include a pair of side rails, each side rail having a lower leg and an upper leg, said upper leg and said lower leg being secured together by a hinge about which the upper leg and the lower leg can pivot with respect to each other between an assembled and a disassembled position.

3. The portable photography studio of claim 2 further including a retractable pin for locking the upper leg and the lower leg in said assembled position.

4. The apparatus of claim 2 wherein each of said support members is hingedly secured to at least one of said upper and lower legs.

5. The portable photography studio of claim 4 further including a base member secured to a support member by a hinge.

6. The portable photography studio of claim 1 wherein the predetermined position in which the frame is held is not perpendicular to the ground.

7. The portable photography studio of claim 1 wherein said illumination device is a softbox, said softbox comprising a light source, a reflective covering and at least one baffle.

8. The portable photography studio of claim 7 wherein the softbox further comprises a collapsible frame.

9. The portable photography studio of claim 7 further comprising a mat including markings used to position the collapsible frame, the softbox and other photographic equipment with respect to each other.

10. The portable photography studio of claim 1 further including a softbox, said softbox comprising a light source, a reflective covering and at least one baffle which cooperates with the light source and reflective covering so that the light produced by the light source contacts all positions of the back of the background with substantially equal intensity.

11. The portable photography studio of claim 10 wherein the softbox further comprises a collapsible frame.

12. A portable photography studio comprising:
  a. a collapsible frame including a plurality of rails, at least one of said rails including a first leg and a second leg movable with respect to each other between a first assembled position wherein said at least one of said rails is substantially straight and a second disassembled position;
  b. a support member for holding said frame in a predetermined position; and
  c. a backdrop comprising a translucent background secured to said frame.

13. The portable photography studio of claim 12 wherein said first leg and said second leg are secured together by a hinge about which the first leg and second leg can pivot between the assembled and disassembled position.

14. The portable photography studio of claim 12 further including a retractable pin for locking the first and second leg in said assembled position.

15. The portable photography studio of claim 12 wherein said support member is secured to the first leg of a rail.

16. The portable photography studio of claim 12 wherein the predetermined position in which the frame is held by said support member is not perpendicular to the ground.

17. The portable photography studio of claim 12 further comprising a mat including markings used to position the frame and other photographic equipment with respect to each other.

\* \* \* \* \*